Dec. 22, 1925.
J. H. HOULT
AUTOMATIC VALVE
Filed March 23, 1925
1,566,748
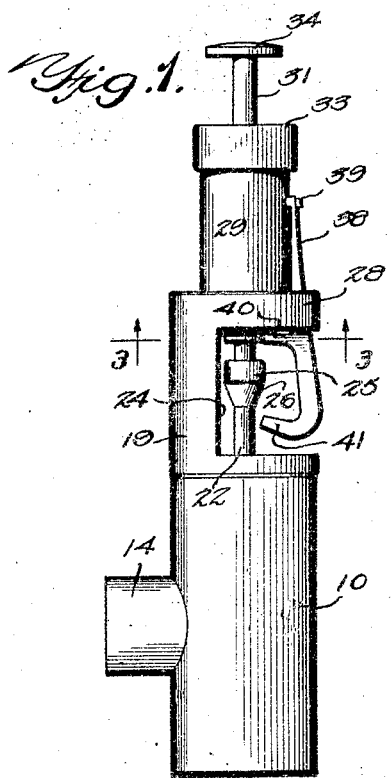
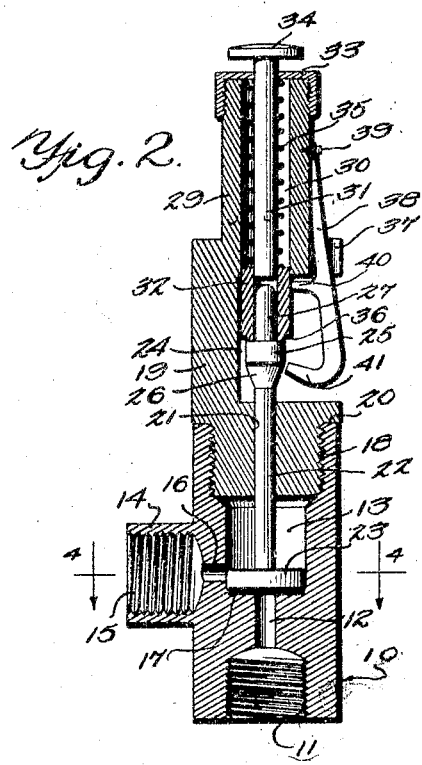
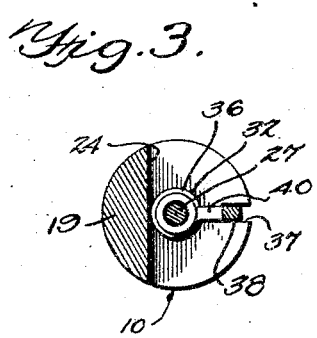
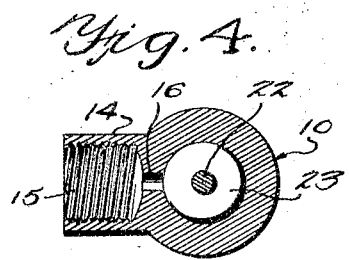
Inventor
J. H. Hoult
By
Attorney Patented Dec. 22, 1925.

1,566,748

UNITED STATES PATENT OFFICE.

JOHN H. HOULT, OF FAIRMONT, WEST VIRGINIA, ASSIGNOR OF ONE-HALF TO ORA M. DOOLITTLE, OF FAIRMONT, WEST VIRGINIA.

AUTOMATIC VALVE.

Application filed March 23, 1925. Serial No. 17,765.

*To all whom it may concern:*

Be it known that I, JOHN H. HOULT, a citizen of the United States, residing at Fairmont, in the county of Marion and State of West Virginia, have invented certain new and useful Improvements in Automatic Valves, of which the following is a specification.

This invention relates to automatic valves and more particularly to a valve adapted to be connected in a gas line and adapted to shut off the flow of gas when the pressure of the latter drops to a predetermined point.

An important object of the invention is to provide a valve structure adapted to be connected in a gas line, particularly in lines adapted for feeding natural gas for heating and illuminating purposes, and adapted to stop the flow of the gas to the heating or illuminating appliances when the pressure of the gas drops to such a point that the appliances will become extinguished.

A further object of the invention is to provide a device of the above mentioned character which is adapted to be unseated by the pressure of the gas flowing therethrough, means being provided for positively moving the valve to its seat upon a predetermined drop in gas pressure.

A still further object is to provide a spring pressed member associated with the cut-off valve and normally latched in inoperative position to permit the flow of gas, movement of the valve to closed position due to a predetermined drop in gas pressure being adapted to release the latching means to permit the spring pressed means to engage the valve and hold it against its seat to prevent the further flow of gas when the pressure thereof again increases.

Other objects and advantages of the invention will become apparent during the course of the following description.

In the drawings, I have shown one embodiment of the invention. In this showing:

Figure 1 is a side elevation of the device shown in operative position,

Figure 2 is a central vertical sectional view through the device, the parts being shown in inoperative position, Figure 3 is a section on line 3—3 of Figure 1, and, Figure 4 is a similar view on line 4—4 of Figure 2.

Referring to the drawings, the numeral 10 designates a valve body having a threaded opening 11 in its lower end adapted for connection with a gas pipe (not shown) which is in turn connected with the usual meter. The valve body is provided with an opening 12 communicating between the opening 11 and a valve chamber 13 formed in the valve body. The valve body is provided preferably at one side with a tubular extension 14 internally threaded as at 15 for connection with a gas feed pipe (not shown) which is in turn connected with any suitable gas appliance to be operated by gas flowing through the valve. The side of the valve body is provided with a port 16 communicating between the opening 15 and the valve chamber 13. The lower end of the chamber 13 surrounding the opening 12 is machined to provide a valve seat 17 for a purpose to be described.

The upper end of the valve body 10 is internally threaded as at 18 to receive the lower externally threaded portion of a supporting member 19. The member 19 is provided at its lower end with a shoulder 20 adapted to engage against the upper end of the valve body 10, as shown in Figure 2. The supporting member 19 is provided in its lower end with an opening 21 arranged coaxial with the valve body 10. A valve stem 22 is arranged to reciprocate within the opening 21 and is preferably of slightly smaller diameter than the opening 21 to permit escape of air from the chamber 13 in a manner to be described. The stem 22 is provided at its lower end with a valve 23 adapted to engage the seat 17, as will be obvious. The upper end of the valve stem extends into a cut away portion 24 formed in the supporting member 19 and is provided near its upper end with an enlarged head 25, the lower end of which is formed as a truncated cone 26. The valve stem extends a substantial distance above the head 25 as shown at 27 for a purpose to be described.

Above the cut out portion 24 the supporting member is provided with a substantially horizontal head 28 and a preferably integral cylindrical member 29 extends upwardly from this head as shown in Figures 1 and 2. The cylinder 29 is provided throughout its length with a bore 30 arranged in axial alinement with the valve stem 22, as will be apparent. A plunger 31 is arranged in the bore 30 and is provided on its lower end with a cylindrical head 32 secured thereto and adapted to slidably receive the upper end 27 of the valve stem. The plunger 31 extends upwardly through a cap 33 threaded on the upper end of the cylinder 29, and the plunger may be provided at its upper end with an operating knob 34. A spring 35 surrounds the plunger 31 and this spring contacts at its upper end with the lower face of the cap 33 and at its lower end with the upper end of the head 32. The spring 35 is of the compression type and it will be obvious that the spring will normally project the plunger 31 and head 32 downwardly. The head 32 is provided at its lower end with an annular shoulder 36, as clearly shown in Figures 2 and 3.

The horizontal portion 28 of the support 19 is provided with a substantially vertical slot 37, as shown in Figures 2 and 5. A latch member 38 is adapted to be arranged in the slot 37 and is supported at its upper end by a screw 39 secured to the cylinder 29 as shown in Figure 2. The upper end of the latch is preferably loosely supported by the screw 39 to permit free swinging movement of the latch within reasonable limits. The latch 38 is provided intermediate its ends with a finger 40 adapted to engage beneath the shoulder 36 when the plunger 31 and head 32 are in the upper position shown in Figure 1. The lower end of the latch is provided with a finger 41 adapted to be engaged by the truncated cone 26 in a manner to be described.

The operation of the device is as follows:

When it is desired to use an appliance connected to the opening 15, the appliance is turned on and the knob 34 lifted against the tension of the spring 35 whereupon the flow of gas, if substantially at normal pressure, will lift the valve 23 from its seat substantially to the position shown in Figure 1 of the drawings whereby the truncated cone 26 will be arranged a substantial distance above the finger 41. This action will permit the finger 40 to engage beneath the shoulder 36 to retain the head 32 in upper position. The appliance being operated will remain lighted as long as the pressure of the gas flowing into the valve body is relatively high. The pressure of the gas, particularly when natural gas is used, fluctuates considerably at times, and if this pressure drops to a point at which the appliance will cease to function, or approximately one-half a pound to the square inch, the valve 23 and associated elements will drop substantially to closed position by gravity. This action will cause the truncated cone 26 to act as a cam against the finger 41, pressing the latch 38 outwardly and releasing the finger 41 from the shoulder 36. The spring 35 will then project the head 32 downwardly, causing the lower end thereof to engage against the upper end of the head 25 and hold the valve 23 in closed position. The spring employed is adapted to exert a downward pressure greater than the maximum pressure of the gas whereby the valve 32 will be maintained positively against its seat until the spring pressure is manually released in the manner previously described.

It will be obvious that if some automatic cut-off means is not employed, the flow of gas when dropping to a relatively low pressure, will cause the appliances to become extinguished and the gas will flow freely into the room when the pressure again increases. With the device just described, it will be apparent that a drop in pressure sufficient to extinguish the flame of the appliance employed will cause the flow of gas to be positively cut off regardless of subsequent increases in gas pressure, until the flow of gas is turned on by manual operation of the device, as previously described. The valve stem fits sufficiently snugly in the upper end of the valve body to properly guide the valve, but is sufficiently loose to permit escape of air from the valve chamber above the valve so as not to interfere with the free upward movement of the valve.

It is to be understood that the form of my invention herewith shown and described is to be taken as a preferred example of the same and that various changes in the shape, size and arrangement of parts may be resorted to without departing from the spirit of the invention or the scope of the subjoined claims.

I claim:

1. A device of the character described comprising a valve body having a valve seat therein, a valve in said valve body normally movable by gravity toward said valve seat and adapted to cooperate therewith to control the flow of gas through said valve body, a valve stem carried by said valve and projecting upwardly therefrom, said stem being provided near its upper end with a cam, a cylinder carried by said valve body above and in axial alinement with said valve stem, a plunger mounted to reciprocate in said cylinder and provided with a shoulder arranged below said cylinder, a compression spring arranged in said cylinder, said spring engaging said cylinder at its upper end and said plunger at its lower end and adapted to project said plunger downwardly against said valve stem to close said valve, and a latch loosely connected at its upper end to said cylinder and provided intermediate its ends with a finger adapted to engage the shoulder of said plunger to render said spring inoperative, said latch being further provided adjacent its lower end with a second finger arranged in the path of travel of said cam to be engaged thereby when said valve moves toward closed position to release said first named finger from the shoulder of said plunger.

2. A device of the character described comprising a cylindrical valve body having a valve chamber therein, a vertically movable valve stem carried by said valve body, a valve carried by the lower end of said stem and adapted to control passage of gas through said chamber, a circular cam carried by said valve stem above said valve body and below the upper end of said valve stem, a plunger mounted to reciprocate above said valve stem and provided with an axial opening to receive the upper end of said valve stem, a spring for normally urging said plunger downwardly, and a latch arranged adjacent said plunger and said cam, said latch being provided with a finger adapted to normally engage said plunger to retain it in upper position and being further provided with a finger arranged in the path of travel of said cam and normally spaced therebelow.

3. A device of the character described comprising a cylindrical valve body having a valve chamber therein, a vertically movable valve stem carried by said valve body and projecting upwardly therebeyond, a valve carried by the lower end of said stem and adapted to control passage of gas through said chamber, a conical cam carried by said valve stem above said valve chamber at a point spaced below the upper end of said valve stem, a support carried by said valve body and arranged thereabove, a plunger carried by said support and provided in its lower end with an axial opening receiving the upper end of said valve stem, a spring arranged in said support and adapted to normally urge said plunger downwardly, a latch pivotally connected adjacent its upper end to said support, said latch being provided with a finger normally engaging said plunger to retain it in upper position and a second finger arranged in the path of travel of said cam and normally spaced therebelow, and an operating knob arranged above said support and connected to said plunger.

In testimony whereof I affix my signature.

JOHN H. HOULT.